(12) United States Patent
Thompto et al.

(10) Patent No.: US 12,210,908 B2
(45) Date of Patent: Jan. 28, 2025

(54) ROUTING INSTRUCTIONS IN A MICROPROCESSOR

(71) Applicant: International Business Machines Corporation, Armonk, NY (US)

(72) Inventors: Brian W. Thompto, Austin, TX (US); Michael Joseph Genden, Austin, TX (US); Tharunachalam Pindicura, Austin, TX (US); Phillip G. Williams, Cape Coral, FL (US); Kent Li, Austin, TX (US); Nir Segev, Emunim (IL); Mehul Patel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 17/362,189

(22) Filed: Jun. 29, 2021

(65) Prior Publication Data

US 2022/0413911 A1 Dec. 29, 2022

(51) Int. Cl.
*G06F 9/50* (2006.01)
*G06F 7/57* (2006.01)
(Continued)

(52) U.S. Cl.
CPC .............. *G06F 9/505* (2013.01); *G06F 7/57* (2013.01); *G06F 9/3001* (2013.01);
(Continued)

(58) Field of Classification Search
None
See application file for complete search history.

(56) References Cited

U.S. PATENT DOCUMENTS

| 9,705,680 B2 | 7/2017 | Gschwind et al. |
| 10,095,543 B1 | 10/2018 | Griffin et al. |

(Continued)

FOREIGN PATENT DOCUMENTS

| CN | 101339523 A | 1/2009 |
| CN | 101344842 A | 1/2009 |
| CN | 111078394 A | 4/2020 |

OTHER PUBLICATIONS

Henderson, T., et al., "Interlayer routing issues for wireless networks", NRL Cross-Layer Workshop, Boeingm Jun. 2, 2004, 36 pages.
(Continued)

*Primary Examiner* — Eric C Wai
(74) *Attorney, Agent, or Firm* — Scully, Scott, Murphy & Presser, P.C.

(57) ABSTRACT

A computer system, processor, programming instructions and/or method for balancing the workload of processing pipelines that includes an execution slice, the execution slice comprising at least two processing pipelines having one or more execution units for processing instructions, wherein at least a first processing pipeline and a second processing pipeline are capable of executing a first instruction type; and an instruction decode unit for decoding instructions to determine which of the first processing pipeline or the second processing pipeline to execute the first instruction type. The processor configured to calculate at least one of a workload group consisting of: the first processing pipeline workload, the second processing pipeline workload, and combinations thereof; and select the first processing pipeline or the second processing pipeline to execute the first instruction type based upon at least one of the workload group.

16 Claims, 8 Drawing Sheets

(51) Int. Cl.
 *G06F 9/30* (2018.01)
 *G06F 9/38* (2018.01)
(52) U.S. Cl.
 CPC .......... *G06F 9/3851* (2013.01); *G06F 9/3867* (2013.01); *G06F 9/5038* (2013.01)

(56) References Cited

U.S. PATENT DOCUMENTS

| | | |
|---|---|---|
| 10,324,726 B1 | 6/2019 | Geary et al. |
| 2021/0089317 A1 | 3/2021 | Liu et al. |

OTHER PUBLICATIONS

IP.com, "Instruction steering policy for balanced utilization of a bifurcatedunified issue queue", IP.com Prior Art Database Technical Disclosure, Mar. 3, 2009, 3 pages.
Anonymous, "Fast wakeup of load dependent instructions by a select bypass", IP.com Prior Art Database Technical Disclosure, Apr. 23, 2012, 2 pages.
Anonymous, "Mechanism to Execute Prefix ADDI and Prefix Store-Double in a Microprocessor", IP.com Prior Art Database Technical Disclosure, Aug. 5, 2020, 3 pages.
Merkel, S., et al., "Dynamic Multi-Objective Evacuation Path Planning in Mobile Ad Hoc Networks", Technical Report, Karlsruhe Institute of Technology, Jan. 21, 2014, 14 pages.
Nagarajan, R., et al., "Static Placement, Dynamic Issue (SPDI) Scheduling for EDGE Architectures", 13th International Conference on Parallel Architecture and Compilation Techniques (PACT 2004), 11 pages.
International Search Report dated Aug. 29, 2022, received in a corresponding foreign application, 9 pages.

| Cycle | 1 | 2 | 3 | 4 | 5 | 6 | 7 | 8 |
|---|---|---|---|---|---|---|---|---|
| Instruction Transmit | MC Arth | MC Arth | MC Arth | MC Arth | MC Arth | MC Arth | MC Arth | MC Arth |
| | MC Arth | MC Arth | MC Arth | MC Arth | MC Arth | MC Arth | MC Arth | MC Arth |
| | MC Arth | MC Arth | MC Arth | MC Arth | MC Arth | MC Arth | MC Arth | MC Arth |
| | MC Arth | MC Arth | MC Arth | MC Arth | MC Arth | MC Arth | MC Arth | MC Arth |
| | MC Arth | MC Arth | MC Arth | MC Arth | MC Arth | MC Arth | MC Arth | MC Arth |
| | MC Arth | MC Arth | MC Arth | MC Arth | MC Arth | MC Arth | MC Arth | MC Arth |
| | MC Arth | MC Arth | MC Arth | MC Arth | MC Arth | MC Arth | MC Arth | MC Arth |
| | MC Arth | MC Arth | MC Arth | MC Arth | MC Arth | MC Arth | MC Arth | MC Arth |
| FX or SX | FX | FX | FX | FX | FX | FX | FX | FX |

| Cycle | 9 | 10 | 11 | 12 | 13 | 14 | 15 | 16 |
|---|---|---|---|---|---|---|---|---|
| Instruction Transmit | Arth | Arth | Arth | Arth | Arth | Arth | Arth | Arth |
| | MC Arth | MC Arth | MC Arth | MC Arth | MC Arth | MC Arth | MC Arth | MC Arth |
| | Load | Load | Store | Load | Arth | Arth | Arth | Store |
| | Store | Load | Store | Arth | Arth | Arth | Arth | Arth |
| | Arth | Arth | Arth | Arth | Arth | Arth | Arth | Arth |
| | Arth | Arth | Arth | Arth | Arth | Arth | Arth | Arth |
| | Arth | Arth | Arth | Arth | Arth | Arth | Arth | Arth |
| | Arth | Arth | Arth | Arth | Arth | Arth | Arth | Arth |
| FX or SX | SX | SX | SX | SX | SX | SX | SX | SX |

| Cycle | 17 | 18 | 19 | 20 | 21 | 22 | 23 | 24 |
|---|---|---|---|---|---|---|---|---|
| Instruction Transmit | MC Arth | MC Arth | MC Arth | MC Arth | MC Arth | * | * | * |
| | MC Arth | MC Arth | MC Arth | MC Arth | MC Arth | * | * | * |
| | MC Arth | MC Arth | MC Arth | MC Arth | MC Arth | * | * | * |
| | MC Arth | MC Arth | MC Arth | MC Arth | MC Arth | * | * | * |
| | MC Arth | MC Arth | MC Arth | MC Arth | MC Arth | * | * | * |
| | MC Arth | MC Arth | MC Arth | MC Arth | MC Arth | * | * | * |
| | MC Arth | MC Arth | MC Arth | MC Arth | MC Arth | * | * | * |
| | MC Arth | MC Arth | MC Arth | MC Arth | MC Arth | * | * | * |
| FX or SX | FX | FX | FX | FX | FX | FX | FX | FX |

FIG. 7

| Cycle | 1 | 2 | 3 | 4 | 5 | 6 | 7 | 8 |
|---|---|---|---|---|---|---|---|---|
| Instruction Transmit | MC Arth | MC Arth | MC Arth | MC Arth | MC Arth | MC Arth | MC Arth | MC Arth |
| | MC Arth | MC Arth | MC Arth | MC Arth | MC Arth | MC Arth | MC Arth | MC Arth |
| | MC Arth | MC Arth | MC Arth | MC Arth | MC Arth | MC Arth | MC Arth | MC Arth |
| | MC Arth | MC Arth | MC Arth | MC Arth | MC Arth | MC Arth | MC Arth | MC Arth |
| | MC Arth | MC Arth | MC Arth | MC Arth | MC Arth | MC Arth | MC Arth | MC Arth |
| | MC Arth | MC Arth | MC Arth | MC Arth | MC Arth | MC Arth | MC Arth | MC Arth |
| | MC Arth | MC Arth | MC Arth | MC Arth | MC Arth | MC Arth | MC Arth | MC Arth |
| | MC Arth | MC Arth | MC Arth | MC Arth | MC Arth | MC Arth | MC Arth | MC Arth |
| FX or SX | FX | FX | FX | FX | FX | FX | FX | FX |

| Cycle | 9 | 10 | 11 | 12 | 13 | 14 | 15 | 16 |
|---|---|---|---|---|---|---|---|---|
| Instruction Transmit | Arth | Arth | Arth | Arth | Arth | Arth | Arth | Arth |
| | MC Arth | MC Arth | MC Arth | MC Arth | MC Arth | MC Arth | MC Arth | MC Arth |
| | Load | Load | Store | Load | Arth | Arth | Arth | Store |
| | Store | Load | Store | Arth | Arth | Arth | Arth | Arth |
| | Arth | Arth | Arth | Arth | Arth | Arth | Arth | Arth |
| | Arth | Arth | Arth | Arth | Arth | Arth | Arth | Arth |
| | Arth | Arth | Arth | Arth | Arth | Arth | Arth | Arth |
| | Arth | Arth | Arth | Arth | Arth | Arth | Arth | Arth |
| FX or SX | SX | SX | FX | FX | FX | FX | FX | FX |

| Cycle | 17 | 18 | 19 | 20 | 21 | 22 | 23 | 24 |
|---|---|---|---|---|---|---|---|---|
| Instruction Transmit | MC Arth | MC Arth | MC Arth | * | * | * | * | * |
| | MC Arth | MC Arth | MC Arth | * | * | * | * | * |
| | MC Arth | MC Arth | MC Arth | * | * | * | * | * |
| | MC Arth | MC Arth | MC Arth | * | * | * | * | * |
| | MC Arth | MC Arth | MC Arth | * | * | * | * | * |
| | MC Arth | MC Arth | MC Arth | * | * | * | * | * |
| | MC Arth | MC Arth | MC Arth | * | * | * | * | * |
| | MC Arth | MC Arth | MC Arth | * | * | * | * | * |
| FX or SX | FX | FX | FX | | | | | |

FIG. 8

ROUTING INSTRUCTIONS IN A MICROPROCESSOR

BACKGROUND OF INVENTION

The present invention generally relates to data processing systems, processors, and processor architecture, and methods of processing large data width instructions, for example for execution in dense math execution units such as, for example, one or more matrix-multiply-add (MMA) units.

Processors currently used in data processing systems process more than one instruction at a time, and often process those instructions out-of-order. In modern computer architecture, there are several known ways to design a computer adapted to perform more than one instruction at a time, or at least in the same time frame. For example, one design to improve throughput includes multiple execution slices within a processor core to process multiple instruction threads at the same time, with the threads sharing certain resources of the processor core. An execution slice may refer to multiple data processing hardware pipelines connected in parallel within a processor to process multiple instructions concurrently. Pipelining involves processing instructions in stages, so that a multi-stage pipelines maintain the same throughput as a single stage pipeline on multi-cycle instructions. Multiple execution slices may be used as part of simultaneous multi-threading within a processor core.

The various pipelined stages may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. An instruction in the issue queue typically is issued to an execution unit in an "execution" stage. The "execution" stage processes the operation as specified by the instruction. Executing an operation specified by an instruction typically includes accepting data, e.g., one or more operands, and producing one or more results. There are usually register files associated with the execution units and/or the issue queue to hold data and/or information for the execution units. Register files typically have information read from and/or written to entries or locations in the register file.

In processors with multiple execution slices or pipelines, during operations one or more execution unit workloads may be higher, e.g., much higher, than the workload being handled by other execution units. In other words, some execution units may be overloaded with instructions while other execution units are lightly loaded. It would be advantageous if the workloads being performed by the different execution units could be better balanced, e.g., more equally distributed between the different execution units, which could improve processor performance and/or decrease latency.

SUMMARY

The summary of the disclosure is given to aid understanding of a computer system, computer architectural structure, processor, processor architecture structure, register files including wide data width (accumulator) register files, and method of balancing the workload of execution units in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, processor architecture structure, register files, and/or their method of operation to achieve different effects.

A computer system, processor, and/or method for processing information is disclosed for balancing the workload of one or more execution units in the system and/or processor, and in an embodiment is directed to balancing the workload between processor pipelines, for example between a Fixed Point (FX) Pipeline and a Simple (SX) Pipeline in a processor. In an aspect, the system, processor and/or method is directed to reducing the workload of a first execution pipeline by routing instructions to other execution units in the system and/or processor. In one or more embodiments a processor for processing information includes: an execution slice, the execution slice comprising at least two processing pipelines having one or more execution units for processing instructions, wherein at least a first processing pipeline and a second processing pipeline of the at least two processing pipelines are capable of executing a first instruction type; and an instruction decode unit for decoding instructions to determine which of the first processing pipeline or the second processing pipeline to execute the first instruction type. In one or more aspects, the processor is configured to calculate at least one of a workload group consisting of: the first processing pipeline workload, the second processing pipeline workload, and combinations thereof; and select the first processing pipeline or the second processing pipeline to execute the first instruction type based upon at least one of the workload group.

Preferably, the system and/or processor is further configured to calculate the first processing pipeline workload, and calculate the second processing pipeline workload. Calculating the first or second processing pipeline workload includes in an embodiment counting a number of at least a first subgroup of instructions executing in the first processing pipeline and/or counting a number of at least a second subgroup of instructions executing in the second processing pipeline, and in an aspect further includes counting all the instructions executed by the execution slice; and determining a percentage of the first subgroup of instructions executed in the first processing pipeline and/or a percentage of the second subgroup of instructions executed in the second processing pipeline based upon at least one of the group consisting of the number of the first subgroup of instructions, the number of the second subgroup of instructions, all the instructions executed by the execution slice, and combinations thereof. Calculating the first processing pipeline workload and calculating the second processing pipeline workload in one or more approaches are performed over a fixed or rolling interval of "N" instructions. In an aspect, calculating the first processing pipeline workload further comprises counting a number of a third subgroup of instructions executed in the first processing pipeline, and determining the percentage of the third subgroup of instructions.

Selecting the first processing pipeline or the second processing pipeline based upon at least one of the workload group in one or more embodiments includes: comparing the first processing pipeline workload to a second processing pipeline workload; calculating the first processing pipeline workload and comparing the first processing pipeline workload to a first threshold, wherein the first threshold is at least one of a first threshold group consisting of a number, a percentage, a ratio, and combinations thereof; selecting the first processing pipeline to execute the type of instruction in response to the first processing pipeline workload being below the first threshold; calculating the first processing pipeline workload; calculating the second processing pipeline workload; comparing the first processing pipeline workload to a first threshold; comparing the second processing pipeline workload to a second threshold; selecting the second processing pipeline to execute the type of the instruction in response to both the first processing pipeline workload being over the first threshold and in response to the second processing pipeline workload being below the second threshold; and selecting the first processing pipeline to execute the type of instruction in response to: the first processing pipeline being equal to or below the first threshold; or both the first processing pipeline workload being over the first threshold and the second processing pipeline workload being equal to or above the second threshold. In a further embodiment, selecting the first processing pipeline or the second processing pipeline based upon at least one of the workload group in one or more embodiments includes: determining whether a number and/or a percentage of the third subgroup of instructions is over a third threshold and selecting the second processing pipeline in response to the number and/or percentage of the third subgroup of instructions executed in the first processing pipeline is over a third threshold.

In an embodiment, the system and/or processor includes at least one Super Slice comprising two execution slices, the first processing pipeline is a Compute pipe having an arithmetic logic execution unit (ALU) configured to execute simple arithmetic instructions, the second processing pipeline is a Store/Branch/Simple pipe having a simple (SX) execution unit configured at least to execute simple arithmetic instructions, and the first instruction type is a simple arithmetic instruction; and the instruction decode unit comprises a first counter to count the number of the first subgroup of instructions where the first subgroup of instructions includes at least multi-cycle arithmetic instructions executed in the Compute pipe. In an aspect, the processor is configured to: count the number of the first subgroup of instructions using the first counter; compare the number of the first subgroup of instructions to a first threshold; select the Compute pipe to execute the simple arithmetic instructions in response to the number of the first subgroup of instructions being below the first threshold; and select the Store/Branch/Simple pipe to execute the simple arithmetic instructions in response to the first subgroup of instructions being equal to or above the first threshold. In a further embodiment, the instruction decode unit further includes a second counter to count the number of the second subgroup of instructions executed in the Store/Branch/compute pipe where the second subgroup of instructions include at least one of a simple group consisting of store instructions, dual-port load instructions, branch instructions, SX instructions and combinations thereof; and a third counter to count a number of instructions processed in the Super Slice. The processor is configured to: calculate a first ratio of the first subgroup of instructions executed in the Compute pipe based upon the number of the first subgroup of instructions executed in the Compute pipe pipeline and the number of instructions counted by the third counter; count the number of the second subgroup of instructions using the second counter; calculate a second ratio of the second subgroup of instructions executed in the Store/Branch/Simple pipe based upon the number of the second subgroup of instructions executed in the Store/Branch/Simple pipe and the number of instructions counted by the third counter; compare the first ratio to a first ratio threshold; compare the second ratio to a second ratio threshold; select the Compute pipe to execute the simple arithmetic instruction in response to the first ratio being below the first ratio threshold or the second ratio being equal to or above the second ratio threshold; and select the Store/Branch/Simple pipe to execute the simple arithmetic instruction in response to the first ratio being equal to or above the first ratio threshold and further in response to the second ratio being below the second ratio threshold.

The foregoing and other objects, features, and advantages of the invention will be apparent from the following more particular descriptions of exemplary embodiments of the invention as illustrated in the accompanying drawings.

BRIEF DESCRIPTION OF THE DRAWINGS

The various aspects, features, and embodiments of a computer system, computer architectural structure, processor, processor architectural structure, processor pipelines, execution units, and/or their method of operation will be better understood when read in conjunction with the figures provided. Embodiments are provided in the figures for the purpose of illustrating aspects, features, and/or various embodiments of the computer system, computer architectural structure, processor, processor architectural structure, processor pipelines, execution units, and their method of operation, but the claims should not be limited to the precise system, embodiments, methods, processes and/or devices shown, and the features, and/or processes shown may be used singularly or in combination with other features, and/or processes.

FIG. 7 illustrates an example of instructions being processed in a processor execution units in accordance with an embodiment of the disclosure;

FIG. 8 illustrates an example of instructions being processed in a processor execution units in accordance with an embodiment of the disclosure;

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, processor architectural structure, processor instruction execution pipelines, execution units, and their method of operation, however, it will be understood by those skilled in the art that different and numerous embodiments of the computer system, computer architectural structure, processor, processor architectural structure, processor instruction execution pipelines, execution units, and their method of operation may be practiced without those specific details, and the claims and invention should not be limited to the system, assemblies, subassemblies, embodiments, functional units, features, circuitry, processes, methods, aspects, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising" specify the presence of stated features, integers, steps, operations, elements, and/or components, but do not preclude the presence or addition of one or more features, integers, steps, operations, elements, components, and/or groups thereof.

The following discussion omits or only briefly describes conventional features of information processing systems, including processors and microprocessor systems and processor architecture, which are apparent to those skilled in the art. It is assumed that those skilled in the art are familiar with the general architecture of processors, and, in particular, with processors having execution pipelines and one or more execution units. It may be noted that a numbered element is numbered according to the figure in which the element is introduced, and is often, but not always, referred to by that number in succeeding figures.

Figure 1:
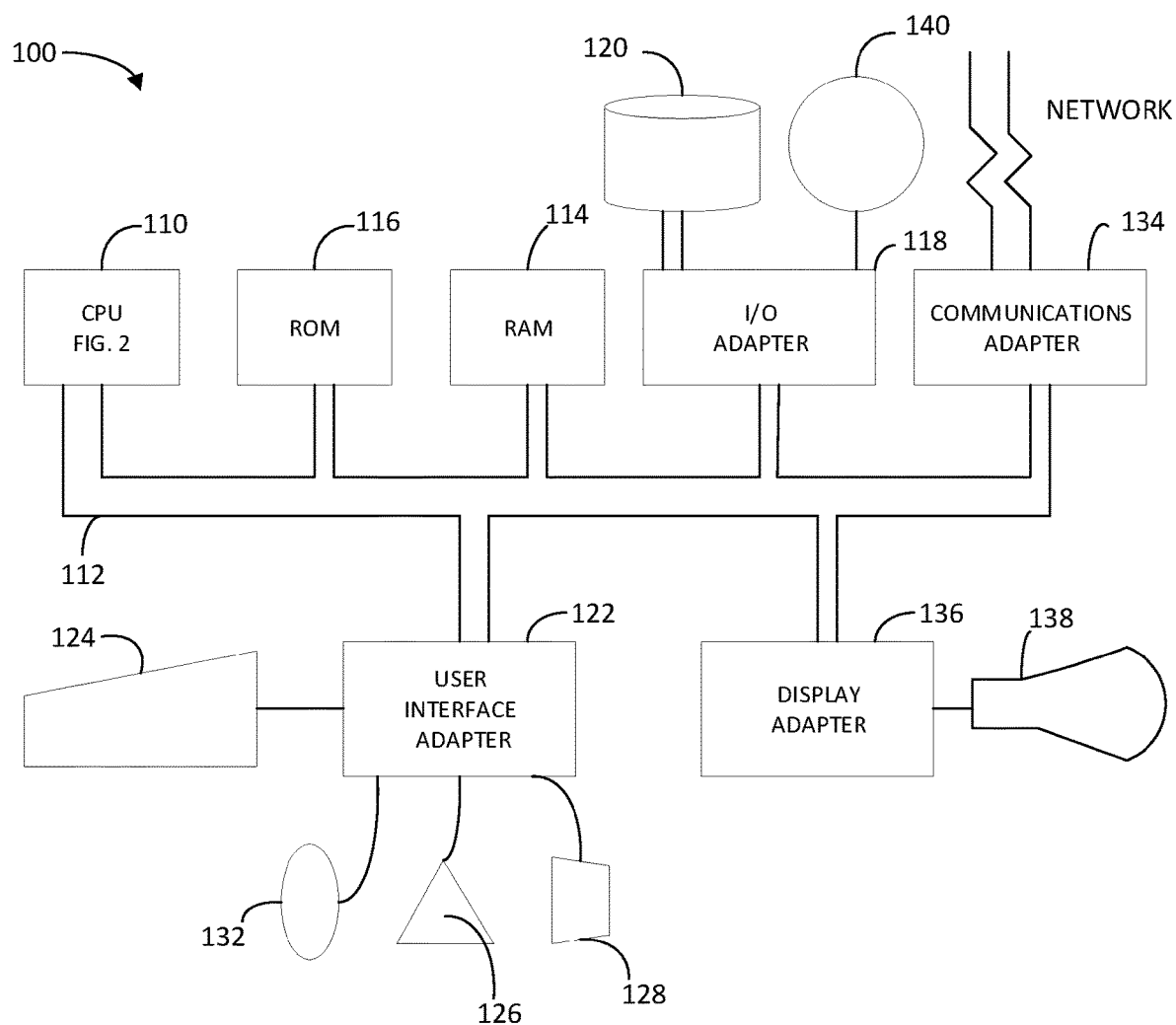
FIG. 1 illustrates an example of a data processing system in which aspects of the present disclosure may be practiced.

FIG. 1 illustrates an example of a data processing system 100 in which aspects of the present disclosure may be practiced. The system has a central processing unit (CPU) 110 also referred to as processor 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126, and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

The CPU (or "processor") 110 includes various registers, buffers, execution units, cache, memories, and other units formed by integrated circuitry, and may operate according to reduced instruction set computing ("RISC") techniques. The CPU 110 processes data according to processor cycles, synchronized, in some aspects, to an internal clock (not shown).

Figure 2:
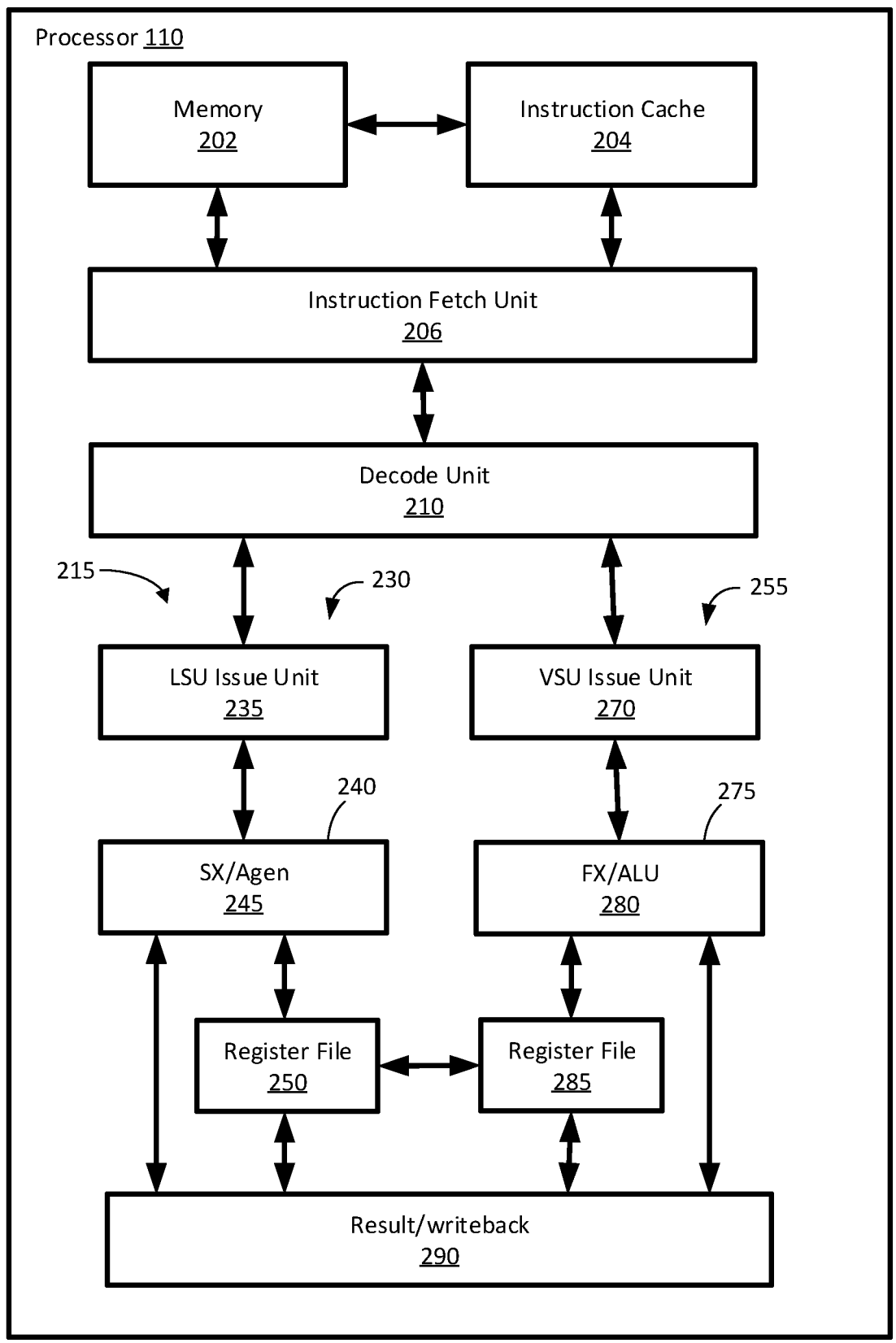
FIG. 2 illustrates a block diagram of a processor in which certain aspects of the present disclosure may be practiced.

FIG. 2 depicts a simplified block diagram of a processor 110 according to an embodiment. The processor 110 includes memory 202, instruction cache 204, instruction fetch unit 206, decode unit 210, an execution slice 215 that includes LSU processing pipeline 230 and VSU processing pipeline 255, and destination resource 290. The processor 110 may be included within a computer system or otherwise distributed within a computer system. Instructions and data can be stored in memory 202, and the instruction cache 204 may access instructions in memory 202 and store the instructions to be fetched. The memory 202 may include any type of volatile or nonvolatile memory. The memory 202 and instruction cache 204 can include multiple cache levels.

In FIG. 2, a simplified example of the instruction fetch unit 206, decode unit 210, and execution slice 215 are depicted. In various embodiments, the processor 110 may include multiple processing execution slices 215, e.g., four execution slices 215. In an embodiment, each execution slice 215 includes an LSU processing pipeline 230 and a VSU processing pipeline 255. In an aspect, the LSU processing pipeline 230 includes an LSU issue unit 235, an execution unit 240, and physical register file 250. The execution unit 240 in an embodiment includes Sx/Agen execution pipeline 245. The LSU processing pipeline 230 may also include other features, such as error checking and handling logic, one or more parallel paths through the LSU processing pipeline 230, and other features now or hereafter known in the art. In an aspect, the VSU processing pipeline 255 includes an VSU issue unit 270, an execution unit 275, and physical register file 285. The execution unit 275 in an embodiment includes FX/ALU execution pipeline 280. The VSU processing pipeline 255 may also include other features, such as error checking and handling logic, one or more parallel paths through the VSU processing pipeline 255, and other features now or hereafter known in the art.

In the processor 110 of FIG. 2, the instruction fetch unit 206 fetches instructions from the instruction cache 204 according to an instruction address, for further processing by the decode unit 210. The decode unit 210 decodes instructions and passes the decoded instructions, portions of instructions, or other decoded data to the appropriate pipeline 230 or 255 depending upon the type of instruction. The decode unit 210 may also detect branch instructions. More specifically, in the example of FIG. 2, the decode unit 210 will transmit the decoded instruction to either the LSU Issue Unit 235 or the VSU Issue unit 270. The respective issue units 235, 270 analyzes the instructions or other data and transmits the decoded instructions, portions of instructions, or other data to one or more execution units 240, 275 in the respective pipelines 230, 255 based on the analysis. The respective physical register file 250, 285 holds data for the respective execution units 245, 280. Physical register files 250, 285 can be separate register files where data in one register file can be used by either execution unit 240, 275, and in an embodiment register files 250, 285 can be a single register file. While a forward path through the processor 110 is depicted in FIG. 2, other feedback and signaling paths may be included between elements of the processor 110.

Execution units 240, 275 perform and execute operations specified by the instructions issued to the respective execution units 240, 275. While LSU pipeline 230 has been shown with execution unit SX/Agen 245, execution unit 240 can include, for example, a plurality of execution units, such as load/store execution units (LSUs), simple units (SXs) that include store address generator (Agen) logic, and/or other execution units. While VSU pipeline 255 has been shown with execution unit FX/ALU 280, execution unit 275 can include, for example, a plurality of execution units, such as fixed-point execution units (FXs), floating-point execution units (FPUs), Arithmetic Logic execution units (ALUs), vector scalar execution units (VSUs), and/or other execution units.

Processor 110 also includes result/write back logic 290 to write the results of executed instructions, e.g., results from LSU processing pipeline 230 and VSU processing pipeline 255, to a destination resource. The destination resource may be any type of resource, including registers, cache memory, other memory, I/O circuitry to communicate with other devices, other processing circuits, or any other type of destination for executed instructions or data. The processor 110 may include other circuits, functional units, and components.

Instructions may be processed in the processor 110 of FIG. 2 in a sequence of logical, pipelined stages. However, it should be understood that the functions of these stages may be merged together so that this particular division of stages should not be taken as a limitation, unless such a limitation is clearly indicated in the claims herein. Indeed, some of the stages or functional units are indicated as a single logic unit in FIG. 2 for the sake of simplicity of understanding, and further detail as relevant will be provided below.

Figure 3:
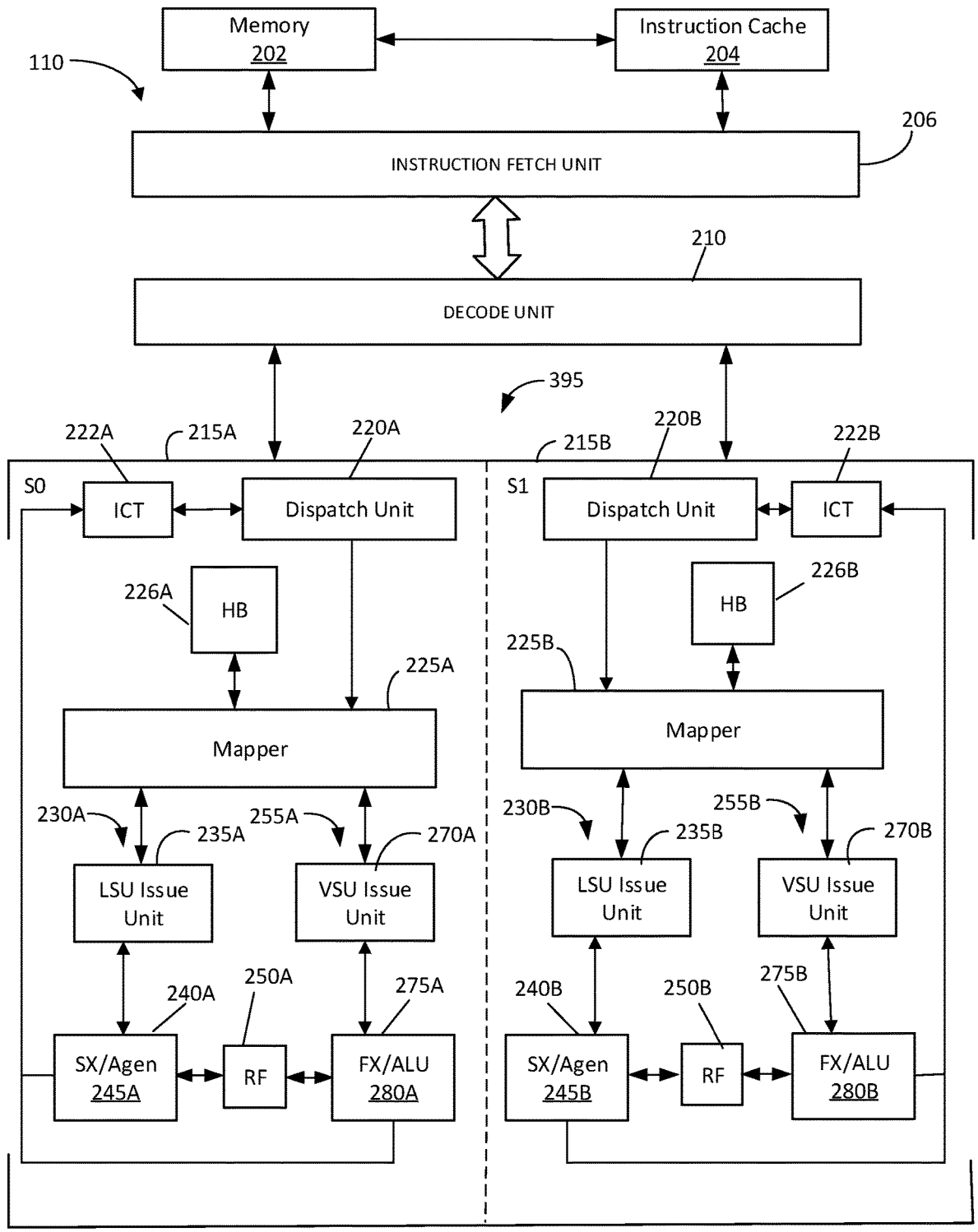
FIG. 3 illustrates a block diagram of a portion of a multi-slice processor having two execution slices in accordance with certain aspects of the present disclosure.

FIG. 3 illustrates a block diagram of a portion of a processor 110, and in this example a multi-slice processor 110 in accordance with an embodiment of the disclosure. It may be noted that FIG. 3 only shows portions of the multi-slice processor 110 in diagrammatic fashion for purpose of discussion. It will be appreciated that the multi-slice processor may have other configurations. As shown in FIG. 3, the multi-slice processor includes two processing slices—Slice 0 (slice S0 or 215A) and Slice 1 (slice S1 or 215B). The processor 110 includes Memory 202, Instruction Cache 204, Instruction Fetch Unit 206 and Decode Unit 210. Each of the slices S0 and S1 includes an Instruction Dispatch Unit (220A and 220B); a Logical Register Mapper (225A and 225B); a History Buffer (HB) (226A and 226B); an Instruction Completion Table (ICT) (222A and 222B); an LSU processing pipeline (230A and 230B); and a VSU processing pipeline (255A and 225B).

Each LSU processing pipeline (230A and 230B) includes an LSU Issue Unit (LSU ISQ) (235A and 235B), and Execution Units (240A and 240B), where each execution unit 240A, 240B in the respective LSU processing pipeline 230A, 230B includes a SX/Agen execution unit (245A and 245B). LSU processing pipeline 230A, 230B can include other execution units, such as, for example, a load store unit (LSU). Each VSU processing pipeline (255A and 255B) includes a VSU Issue Unit (VSU ISQ) (270A and 270B) and Execution Units (275A and 275B), where each execution unit 275A, 275B in the respective VSU processing pipeline 255A, 255B includes a FX/ALU execution unit (280A and 280B). VSU processing pipeline 255A, 255B) can include other execution units, such as, for example, vector scalar units (VSUs) and floating point execution units (FPUs). A physical Register File (RF) 250A can be used by both LSU processing pipeline 230A and VSU processing pipeline 255A, while a physical Register File 250B can be used by both LSU processing pipeline 230B and VSU processing pipeline 255B. While processor 110 in FIG. 3 shows a single register file 250A, 250B shared between the LSU and VSU processing pipelines, it can be appreciated that one or more register files 250 can be used in the LSU and VSU processing pipelines and across execution slices 215A and 215B. The Execution Units 240A, 240B, 275A, 275B can include one or more queues to hold instructions for execution by the Execution Units.

It may be noted that the two slices 215A, 215B are shown for ease of illustration and discussion only, and that multi-slice processor 110 may include more than two execution slices with each slice having all the components discussed above for each of the slices S0 and S1 (slices 215A and 215B). Further, the processing slices may be grouped into super slices (SS 395), with each super slice including a pair of processing or execution slices. For example, a multi-slice processor may include two super slices SS0 and SS1, with SS0 (e.g., 395) including slices S0 and S1, and SS1 (not shown) including slices S2 and S3.

The Instruction Fetch Unit 206 fetches instructions to be executed by the processor 110 or processor super slice 395. Instructions that are fetched by the Instruction Fetch Unit 206 are sent to the Decode Unit 210 where the instructions are decoded by instruction type. The Decode Unit 210 transmits the decoded instructions to respective Instruction Dispatch Unit 220A, 220B. The Instruction Dispatch Units 220A, 220B dispatches instructions to LSU Issue Unit 235 or VSU Issue Unit 255 depending upon the type of instruction and which execution units 240 or 275 should process that particular instruction. The Instruction Dispatch Units 220A, 220B dispatch the instructions to the respective LSU Issue Unit 235 or VSU Issue Unit 255 typically in program order. In one or more embodiments, each instruction dispatched to the LSU Issue Unit 235 or VSU Issue Unit 270 is stamped with an identifier, e.g., identification tag (iTag), to identify the instruction. The instructions can be stamped with other information and metadata. The instructions (iTags) typically are allocated (assigned) and stamped in ascending program order on a per thread basis.

The respective LSU Issue Unit 235 or VSU Issue Unit 270 will issue instructions to the respective execution Units 240 or execution units 275 based upon the instruction type. For example, multi-cycle arithmetic instructions, matrix-multiply accumulator (MMA) instructions are typically handled by the VSU processing pipeline 255 (for example by FX/ALU execution unit 280), while store instructions, load instructions (including dual port loads), branch and store instructions are typically handled in the LSU processing pipeline 230. The LSU and VSU Issue Units 235, 270 typically hold an instruction until data associated with the instruction has been retrieved and ready for use. In certain aspects, the respective LSU Issue unit 235 and VSU Issue Unit 270 holds a set of instructions and the physical register file 250 accumulates data for the instruction inputs. A register file may be used for staging data between memory and other functional (execution) units in the processor. There may be numerous register files and types. When all source data accumulates for the instruction, the data in one or more embodiments is passed on to one or more execution units designated for execution of the instruction. A physical register (or main register) file 250 may serve to store data to be used in an operation specified in an instruction dispatched to an Execution Unit 240, 275, and the result of the operation performed by the Execution Units 240, 275 may be written to the designated target register entry in the physical register file 250. Each of the execution units, e.g., SX/Agens 245 and FX/ALUs 280, can make result data available on the write back buses for writing to a register file (STF) entry.

Logical register mapper 225 contains metadata (e.g., iTag, STFtag, etc.) which provides a mapping between entries in the logical register (e.g., GPR1) and entries in physical (main) register file 250 (e.g., physical register array entry). The STFtag is the pointer that correlates a logical register entry to a physical register file entry. For example, when an instruction wants to read a logical register, e.g., GPR1, the logical register mapper 225 tells respective issue unit 235, 270, which tells respective execution unit 240, 275, e.g., SX/Agen 245 and FX/ALU 280 where in the physical register file 250 it can find the data, e.g., the physical register array entry. The respective Execution Unit 240, 275, e.g., SX/Agen 245 or FX/ALU 280, executes instructions out-of-order and when the respective Execution Unit 240, 275 finishes an instruction, the respective Execution Unit 240, 275 will send the finished instruction, e.g., iTag, to the ICT 222. The ICT 222 contains a queue of the instructions dispatched by the Dispatch Unit 220 and tracks the progress of the instructions as they are processed.

When a mispredicted branch instruction or other exception is detected, instructions and data subsequent to the mispredicted branch or exception are discarded, e.g., flushed from the various units of processor 110. A history buffer (HB) 226, e.g., Save & Restore Buffer (SRB) 226, contains both speculative and architected register states and backs up the logical register mapper 225 when a new instruction is dispatched. In this regard, the history buffer 226 stores information from the logical register mapper 225 when a new instruction evicts data from the logical register mapper 226 in case the new instruction is flushed and the old data needs to be recovered. The history buffer (HB) 226 keeps the stored information until the new instruction completes. History buffer (HB) 226 interfaces with the logical register mapper 225 in order to restore the contents of logical register mapper 225 from the history buffer (HB) 226 back to the logical register mapper 225, updating the pointers in the logical register mapper 225 so instructions know where to obtain the correct data, e.g., the processor is returned to the state that existed before the interruptible instruction, e.g., the branch instruction was mispredicted.

A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Simultaneous processing in multiple execution slices may considerably increase processing speed of the multi-slice processor. In single-thread (ST) mode a single thread is processed, and in SMT mode, two threads (SMT2) or four threads (SMT4) are simultaneously processed.

As indicated above instructions are decoded in decode unit 210 and are directed to one of multiple execution units for execution in the processor. In many processors, a number of instructions can be executed by one or more execution units. For example, simple arithmetic operations, or other trivial instructions can be executed by more than one execution unit. To reduce latency a processor can direct instructions capable of execution by more than one pipeline and/or execution unit to one of the one or more pipelines and/or execution units in the processor capable of executing the instruction based upon the workload of the various pipelines and/or execution units. In one or more embodiments, a processor, in response to executing instructions capable of execution in one or more pipes and/or execution units, can determine the workload of the one or more pipes and/or execution units, and direct those instructions for execution to one of the one or more pipelines and/or execution units based upon the workload of the pipelines and/or execution units in the processor that are capable of executing that instruction.

For example, in an arithmetic intensive workload, arithmetic units, such as, for example, fixed point (FX) execution units that typically would execute simple arithmetic instructions may be overloaded with arithmetic instructions, e.g., multi-cycle arithmetic instructions and/or multiply-matrix add (MMA) instructions (in addition to other computational instructions), while other execution units, for example SX execution units that are also capable of executing simple arithmetic instructions are lightly loaded. To reduce the FX execution workload, in one or more embodiments, the processor, e.g., the Instruction Decode Unit (IDU) in the processor, can implement logic to detect and/or determine the workload of the FX execution unit/pipeline and the workload of the SX execution unit/pipeline, and route simple arithmetic instructions capable of execution in either the FX or SX execution units, to the FX or SX unit based upon the respective workloads of those two pipelines and/or execution units.

For example, trivial and/or simple instructions that are typically handled in the VSU processing pipeline but which can also be executed in the LSU processing pipeline can be directed to be executed in the LSU processing pipeline, and vice versa, based upon the workloads of those two processing pipelines. For example, if the workload of the VSU pipeline is heavy and the workload of the LSU pipeline is relatively light, the processor can direct the simple and/or trivial arithmetic instructions capable of execution in the LSU pipeline to the LSU pipeline. One frequently used instruction that is relatively simple, and/or capable of being handled in more than one of the processing pipelines in the Power ISA is the addi instruction. The addi instruction is a relatively simple arithmetic operation that is typically executed in the VSU processing pipeline by arithmetic execution units, e.g., FX execution units. The addi instruction can also be executed in the LSU processing pipeline by SX units, e.g., store address generation (Agen) execution units. During operation of the processor, the FX units could be overloaded with arithmetic instructions other than the addi instruction, e.g., multi-cycle arithmetic operations, while the SX units which are also capable of executing the addi instruction have a light workload. To reduce the FX execution unit workload and decrease latency and increase processor throughput and performance, the addi instructions can be redirected to the SX units for execution. In one or more embodiments, the instruction decode unit (IDU) can implement logic to detect and/or determine the workload of one or more of the execution units and/or pipelines, and in response to the workload of the one or more execution units/pipelines, can redirect or reroute instructions to an alternative execution unit and/or pipeline for execution. One mechanism for detecting and/or determining the workload of the different execution units and/or processing pipelines is to implement one or more counters to count the various instructions handled by particular execution units and/or processing pipelines.

Figure 4:
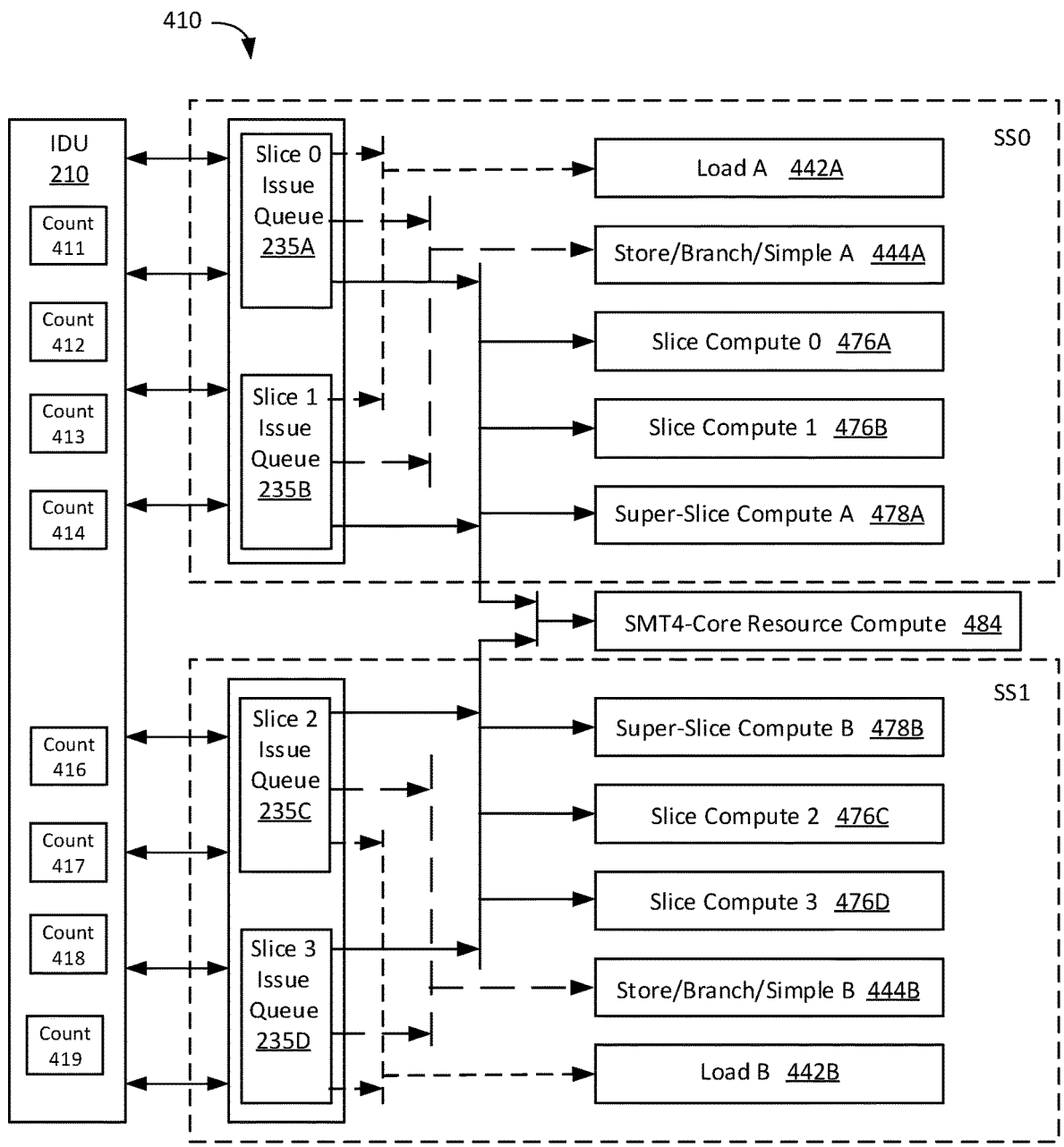
FIG. 4 illustrates a block diagram of a portion of a multi-slice processor having four execution slices arranged as two super-slices according to an embodiment of the disclosure.

Turning to FIG. 4, another embodiment of a portion of a processor 410 is illustrated. Processor 410 is a multi-slice processor that has four (4) execution slices configured as two super slices (SS0 and SS1). Super Slice A (SS0) is the same as Super Slice B (SS1), where in four thread mode (SMT4) threads 0 and 2 are handled in SS0 and threads 1 and 3 are handled in SS1. The Instruction Decode Unit (IDU) 210 in the disclosed embodiment has eight (8) transmit lanes to Issue Queues 235A-235D, where transmit lanes 0:3 fed Super-Slice A (SS0) and transmit lanes 4:7 fed Super-Slice B (SS1). Transmit lanes 0:3 of Instruction Decode Unit (IDU) 210 transmit instructions to Slice 0 Issue Queue 235A and to Slice 1 Issue Queue 235B, while transmit lanes 4:7 of Instruction Decode Unit (IDU) 210 transmit instructions to Slice 2 Issue Queue 235C and to Slice 3 Issue Queue 235D. Super-Slice SS0 Issue Queues 235A, 235B and Super-Slice SS1 Issue Queues 235C, 235D issue instructions to one of a plurality of pipes based upon the type of instruction. In the example of FIG. 4, Issue Queues 235A, 235B can issue instructions to one of Load A pipe 442A, Store/Branch/Simple A pipe 444A, Slice Compute 0 pipe 476A, Slice Compute 1 pipe 476B, Super-Slice Compute A pipe 478A, and/or SMT4-Core Resource Compute pipe 484. In the example of FIG. 4, Issue Queues 235C, 235D can issue instructions to one of Load B pipe 442B, Store/Branch/Simple B pipe 444B, Slice Compute 2 pipe 476C, Slice Compute 3 pipe 476D, Super-Slice Compute B pipe 478B, and/or SMT4-Core Resource Compute pipe 484. The operation of processor 410 in FIG. 4 will be described mainly by reference to the operations of Super Slice A (SS0), as it can be appreciated that Super Slice A (SS0) is a copy of Super Slice B (SS1). It can be appreciated that each of pipes 442, 444, 476, 478, and 484 can include one or more execution units to execute the instructions issued down the respective pipe.

In the example of FIG. 4, with reference to Super Slice A (SS0) and recognizing that Super Slice B (SS1) is similarly configured, the Store/Branch/Simple A pipe 444A includes a Simple (SX) pipeline, which includes store address generation (Agen) logic, that can handle store operations and simple arithmetic operations, as well as other operations. The Slice Compute 0 pipe 476A includes a fixed point (FX) pipeline which includes an arithmetic logic (ALU) execution unit that is used for arithmetic operations. Simple arithmetic operations are typically handled, e.g., executed, in the Slice Compute 0 pipe 476A but can also be handled, e.g., executed, in the Store/Branch/Simple pipe 444A. For example, the addi instruction is typically handled in the Slice Compute 0 pipe 476A by the ALU execution unit, and can also be executed in the Store/Branch/Simple A pipe 444A by the SX pipeline. In one or more embodiments, if the Slice Compute 0 pipe 476A has a heavy workload, and the Store/Branch/Simple A pipe 444A has a relatively light workload, simple arithmetic instructions, such as, for example, the addi instruction, can be directed to the Store/Branch/Simple A pipe 444A for execution.

In one or more embodiments, the IDU 202 will track one or more groups or subgroups of instructions transmitted to one or more of the processing pipelines to determine the workload of the various processing pipelines and/or execution units. In an embodiment, one or more counters are used to track the one or more groups or subgroups of instructions transmitted to one or more of the processing pipelines and/or execution units. In an example embodiment of FIG. 4, the Instruction Decode Unit (IDU) 210 tracks multiple instruction groups, for example, instructions groups that are directed to Super Slice A (SS0) and instruction groups that are directed to Super Slice B (SS1). In an aspect, Instruction Decode Unit (IDU) 202 can have one or more counters that count certain instructions, groups of instructions, or subgroups of instructions transmitted over lanes 0:3 to Super Slice A (SS0), and one or more other counters that count certain instructions, groups of instructions, or subgroups of instructions transmitted over lanes 4:7 to Super Slice B (SS1). The one or more counters that count certain instructions transmitted over lanes 0:3 to Super Slice A (SS0) facilitate determining the workload in Super Slice A (SS0), and in one or more aspects determining the workload of the different pipes 442A, 444A, 476A, 476B, 478A and/or 484. The one or more counters that count certain instructions transmitted over lanes 4:7 to Super Slice B (SS1) facilitate determining the workload in Super Slice B (SS1), and in one or more aspects determining the workload of the different pipes 442B, 444B, 476C, 476D, 478B and/or 484.

Figure 5:
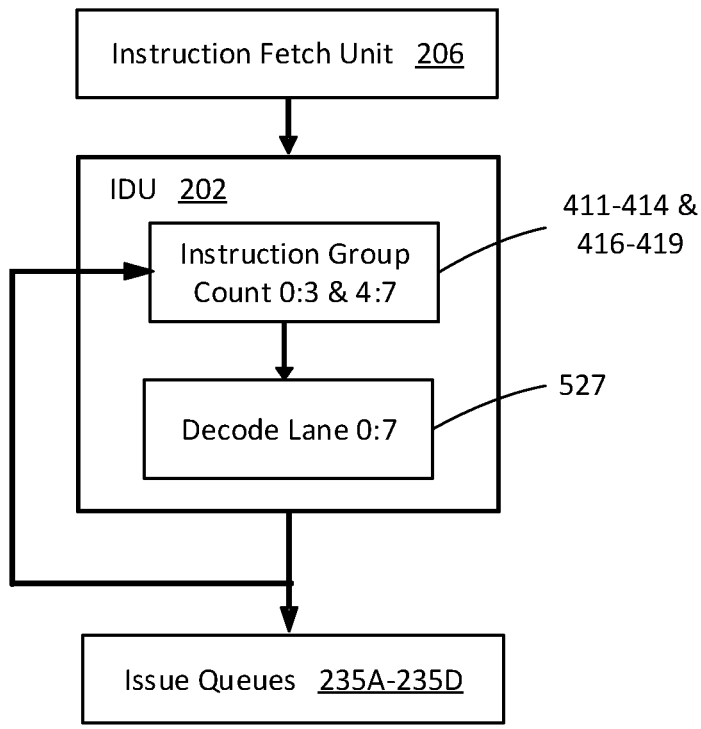
FIG. 5 illustrates a block diagram showing a portion of a processor pipeline in accordance with an embodiment of the disclosure.
Figure 6:
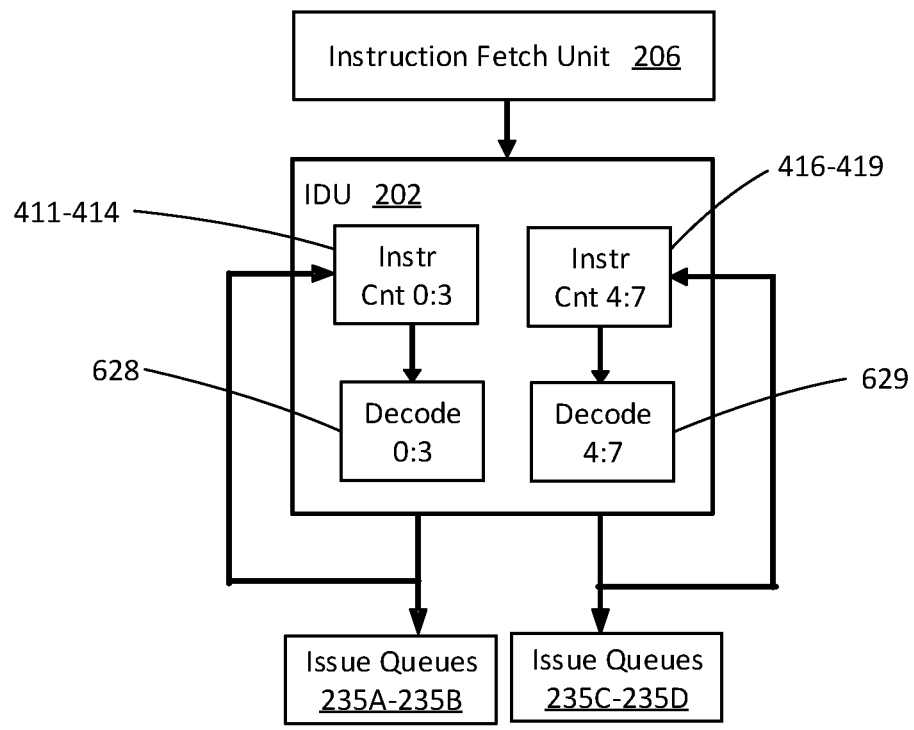
FIG. 6 illustrates simplified block diagram showing a portion of a processor pipeline in accordance with an embodiment of the disclosure.

FIG. 5 illustrates a portion of a simplified block diagram of Instruction Decode Unit (IDU) 202 where in single thread mode (SMT1) or dual thread mode (SMT2), all eight (8) lanes 0:7 (527) transmitting to both Supper Slices SS0, SS1, e.g., Issue Queues 235A-235D, are counted by counters 411-414 and counters 416-419 and the routing to various pipes and/or execution units will affect all eight (8) decode lanes 527. FIG. 6 illustrates a portion of a simplified block diagram of Instruction Decode Unit (IDU) 202 where in four thread mode (SMT4), instructions counted by counters 411-414 on transmit lanes 0:3 will affect decode lanes 0:3 (628) to Super Slice SS0 Issue Queues 235A-235B, and instructions counted by counters 416-419 on transmit lanes 4:7 will affect decode lanes 4:7 (629) to Super Slice SS1 Issue Queues 235C-235D.

In one or more embodiments, as shown in FIG. 4, the IDU 210 includes multiple counters 411-414 and counters 416-419, where counters 411-414 facilitate determining the workload of the various pipelines in Super Slice A SS0, and counters 416-419 facilitate determining the workload of the various pipelines in Super Slice B SS1. More specifically, counters 411-414 count various instructions (or groups/subgroups of instructions) transmitted over lanes 0:3 to Issue Queues 235A, 235B in Super Slice A (SS0), while counters 416-419 count various instructions (or groups of instructions) transmitted over lanes 4:7 to Issue Queues 235C, 235D in Super Slice B (SS1).

In an aspect, for example in the processor of FIG. 4, counter 411 is arranged and configured to count the total number of instructions (e.g., all instructions) transmitted to Super Slice A (SS0), while counter 416 counts the total number of instructions (e.g., all the instructions) transmitted to Super Slice B (SS1). Preferably, each of counters 411 and 416 can be contained within IDU 202. In one approach, for example in the processor 410 of FIG. 4, where simple arithmetic instructions, for example addi instructions, are capable of being executed in more than one pipe and/or execution unit in a processor, e.g., a first pipe/execution unit and a second pipe/execution unit, then a first counter can count the instructions (or a group of instructions) transmitted to one of the pipes and/or execution units, e.g., to the first pipe and/or execution unit, and a second counter can count the instructions (or group of instructions) transmitted to another one of the pipes and/or execution units, e.g., to the second pipe and/or execution unit, to determine the work loads and/or relative work loads of the different pipes and/or execution units. In one or more embodiments, based upon the workload of the different pipes and/or execution units, the processor can direct instructions to the different pipes and/or execution units based upon the workload of one pipe and/or execution unit, e.g., the first pipe and/or execution unit, or the other pipes and/or execution units, e.g., the second pipe and/or execution unit.

Turning to a specific example in the processor of FIG. 4, simple arithmetic instructions, for example addi instructions, are capable of being executed in more than one pipe and/or execution unit in Super Slice A (SS0). Simple arithmetic instructions, for example addi instructions, in processor 410 are capable of being executed in Slice Compute 0 pipe 476A and in Store/Branch/Simple A pipe 444A in Super Slice SS0. Counter 412 is configured in an aspect to count the number of a first subgroup of arithmetic resource intensive instructions handled by Slice Compute 0 pipe 476A, e.g., multi-cycle arithmetic (MC Arth) instructions, counter 413 is configured to count the number of a third subgroup of instructions, e.g., matrix-multiply accumulator (MMA) instructions (e.g., heavy resource intensive compute instructions), and counter 414 is configured to count the number of a second subgroup of instructions handled by Store/Branch/Simple A pipe 444A, for example, the number of store, dual port load, branch and SX instructions. It can be appreciated that for Super Slice B (SS1), counter 417 is configured and arranged similar to counter 412, counter 418 is configured and arranged similar to counter 413, and counter 419 is configured and arranged similar to counter 414. In the example, the first subgroup of instructions can include, but is not limited to, multi-cycle arithmetic instructions such as, for example, xxbrd, vsubcuq, ddiv, vsbox, vdivsw, fcfid; and the third subgroup of instructions can include, but is not limited to MMA instructions, such as, for example, xvbf16ger2, xvf16ger2, xvf32ger, xvf64ger; and xvi4ger2. In the example, the second subgroup of instructions can include, but is not limited to store, dual-port load, branch, and simple (SX) instructions, such as, for example, store instructions stsdx, std, stdu, sth, stmd, and stwd; dual port load instructions lxvp, lxvpx, lq, and lqarx; branch instructions b, ba, bl, bla, bc, bca, bclr, bclrl, bcctr, and bcctrl; and simple (SX) instructions mfspr, and mtspr.

The processor 410 contains logic to use the counter values to determine the workload of the Store/Branch/Simple A pipe 444A and to determine the workload of the Slice Compute A pipe 476A, and can direct simple arithmetic instructions based upon the determined workload values and/or percentages. Several different setting can be implemented to accommodate different workload tuning, e.g., determine when to send simple arithmetic instructions, e.g., the addi instruction, to which of the two or more pipes, e.g., the Store/Branch/Simple A pipe 444A or the Slice Compute 0 pipe 476A. The several different settings can be predetermined, preset, adjustable, and/or programmable. The processor 410 can use count values and/or ratios (percentages) of certain and/or different instructions as a basis to determine when to direct a certain instruction, e.g., a simple arithmetic instruction, to which pipe and/or execution unit.

In one or more embodiments, the processor determines a ratio or percentage of multi-cycle arithmetic instructions; a ratio or percentage of matrix-multiply-add (MMA) instructions; and/or a ratio of store instructions, dual port load instructions, branch instructions, and simple (SX) instructions processed on one Super Slice (SS0 or SS1) of processor and based on those ratios determines whether to send the simple arithmetic instruction, e.g., the addi instruction to either the Slice Compute 0 pipe 476A or the Store/Branch/Simple A pipe 444A. For example, the ratios of the first subgroup of instructions counted by counter 412, the third subgroup of instructions counted by counter 413, and the second subgroup of instructions counted by counter 414, is used to determine whether to send the simple arithmetic instruction to either the Slice Compute 0 pipe 476A (e.g., the FX unit in Slice Compute 0 pipe 476A) or the Store/Branch/Simple A pipe 444A (e.g., the SX unit in the Store/Branch Simple A pipe 444A).

The ratios of instructions can be counted over every fixed number "N" of instructions, for example, after every sixty-four (64) instructions. In this case, the ratios can be calculated from the counter values after every sixty-four (64) instructions, e.g., after 64 instructions, 128 instructions, 192 instructions, etc. That is, for every sixty-four (64) transmitted instructions, the counts for each of the instruction groups are sampled. The processor, preferably the IDU, compares the sampling result with threshold control settings and keeps the routing for simple arithmetic instructions the same or re-routes the simple arithmetic instructions over the next sixty-four (64) instructions. An example of making a determination as to which pipe and/or execution unit to use based upon a fixed number of sixty-four (64) instructions is illustrated in FIG. 7, where after sixty-four (64) multi-cycle arithmetic (MC Arth) instructions, the workload of the FX unit handling the multi-cycle arithmetic (MC Arth) instructions is high, (e.g., above a threshold for those sixty-four (64) instructions), and simple arithmetic instructions, e.g., addi instructions, for the next fixed sixty-four (64) instructions are routed to be handled by the SX unit (in the Store/Branch/Simple pipe 444). In FIG. 7, after one hundred and twenty-eight (128) instructions, the sampling results of the counters has changed so the processor goes back to transmitting simple arithmetic instructions to the FX unit in the Slice Compute pipe 476.

The determination and/or sampling of the ratios and counter values can also be performed on a rolling basis, for example over the last number "N" cycles. For example, the sampling and ratios can be determined based upon the last sixty-four (64) instructions, such that the sampling result and/or ratios are determined after each instruction based upon the last sixty-four (64) instructions. The processor, preferably the IDU, compares the sampling result based upon the last sixty-four (64) instructions with the threshold control settings and determines how to direct the simple arithmetic instructions. An example of making a determination as to which pipe and/or execution unit to use based upon a rolling number "N" of instructions, e.g., a rolling number of sixty-four (64) instructions, is illustrated in FIG. 8, where after sixty-four (64) multi-cycle arithmetic (MC Arth) instructions, the workload of the FX unit is determined. In FIG. 8, after the first sixty-four (64) instructions, the workload of the FX unit is calculated and determined to be high so the processor directs simple arithmetic instructions to the SX unit in the Store/Branch/Simple pipe 444. After the sixty-fourth ($64^{th}$) instruction, the processor slice (SS0) starts to handle instructions other than Multi-Cycle Arithmetic (MC Arth) instructions such as simple arithmetic calculations (Arth) and load instructions (Load) and store instructions (Store). After each instruction after the $64^{th}$ cycle, the processor samples the results from the last 64 instructions and determines the ratios. After the nineth ($9^{th}$) cycle, e.g., seventy-two (72) instructions, the ratios have not changed enough and simple arithmetic instructions, e.g., addi instructions, continue to be routed to the SX unit in the Store/Branch/Simple pipe 444. After, the nineth cycle, e.g. seventy-two instructions, the processor continues to handle a less intensive arithmetic workload and after the tenth cycle, e.g., 80 instructions, the ratios of the last 64 instructions has changed sufficiently such that simple arithmetic instructions, e.g., the addi instruction, are redirected back to the FX unit, e.g., the Slice Compute pipe 476.

The processor, e.g., IDU 202, can be programmed to handle a number of different conditions to redirect instructions to an alternative pipe and/or execution unit. In the example of processor 410 in FIG. 4, two conditions can be programmed to cause the IDU 202 to send simple arithmetic instructions, e.g., the addi instruction, from a Compute pipe, like Compute pipe 476, and/or execution unit like FX unit, to an alternative pipe and/or execution unit, like Store/Branch/Simple pipe 444 and/or like execution unit like SX unit. One condition that will direct simple arithmetic instructions to Store/Branch/Simple pipe 444 (e.g., a SX unit) is where multi-cycle instructions are over a first threshold; and store, dual load port, branch and simple (SX) instructions are under a second threshold. Another condition that will direct simple arithmetic instructions, e.g., the addi instruction, to Store/Branch/Simple pipe 444 (e.g., a SX unit) is where MMA instructions are over a third threshold.

In an example, the first threshold pertaining to the multicycle instructions is where over a fixed or rolling number N of instructions (e.g., over sixty-four instructions), the number of multicycle arithmetic (MC Arth) instructions are greater than, for example, twenty percent (20%), greater than for example thirty percent (30%), or greater than for example forty percent (40%); and the second threshold of store, dual load port, branch, and simple (SX) instructions over the same fixed or rolling number N of instructions is less than for example fifteen percent (15%), less than for example twenty-five (25%), or less than for example thirty-five (35%). It can be appreciated that for Super Slice A (SS0) the ratio or percentage of multi-cycle arithmetic (MC Arth) instructions can be calculated by looking at the count values in counter 412 and counter 411; the ratio or percentage of store, dual-port load, branch and SX (simple) instructions can be calculated by looking at the values in counter 414 and counter 411; and the ratio or percentage of MMA instructions can be calculated by looking at the count values in counter 413 and counter 411. Ratios and/or percentages can be calculated for Super Slice B (SS1) by using the values in respective counters 416-419 in the same manner as using respective counters 411-414 in Super Slice A (SS0). It can be appreciated that the threshold percentage/ratio values can be different than the example values, and will in part be a matter of processor architecture and design considerations. Number values from the counters, as opposed to ratios and percentages can be used to set the conditions and/or thresholds for determining the workload of the various pipes and/or execution units.

It can be appreciated that by selectively routing simple arithmetic instructions, e.g., addi instructions, to alternative execution units for execution when the primary execution unit for handling the simple arithmetic instruction has a heavy arithmetic/computational workload, such as from multi-cycle arithmetic and/or MMA instructions, can balance workload between execution units and increase processor performance and decrease processor latency.

Figure 9:
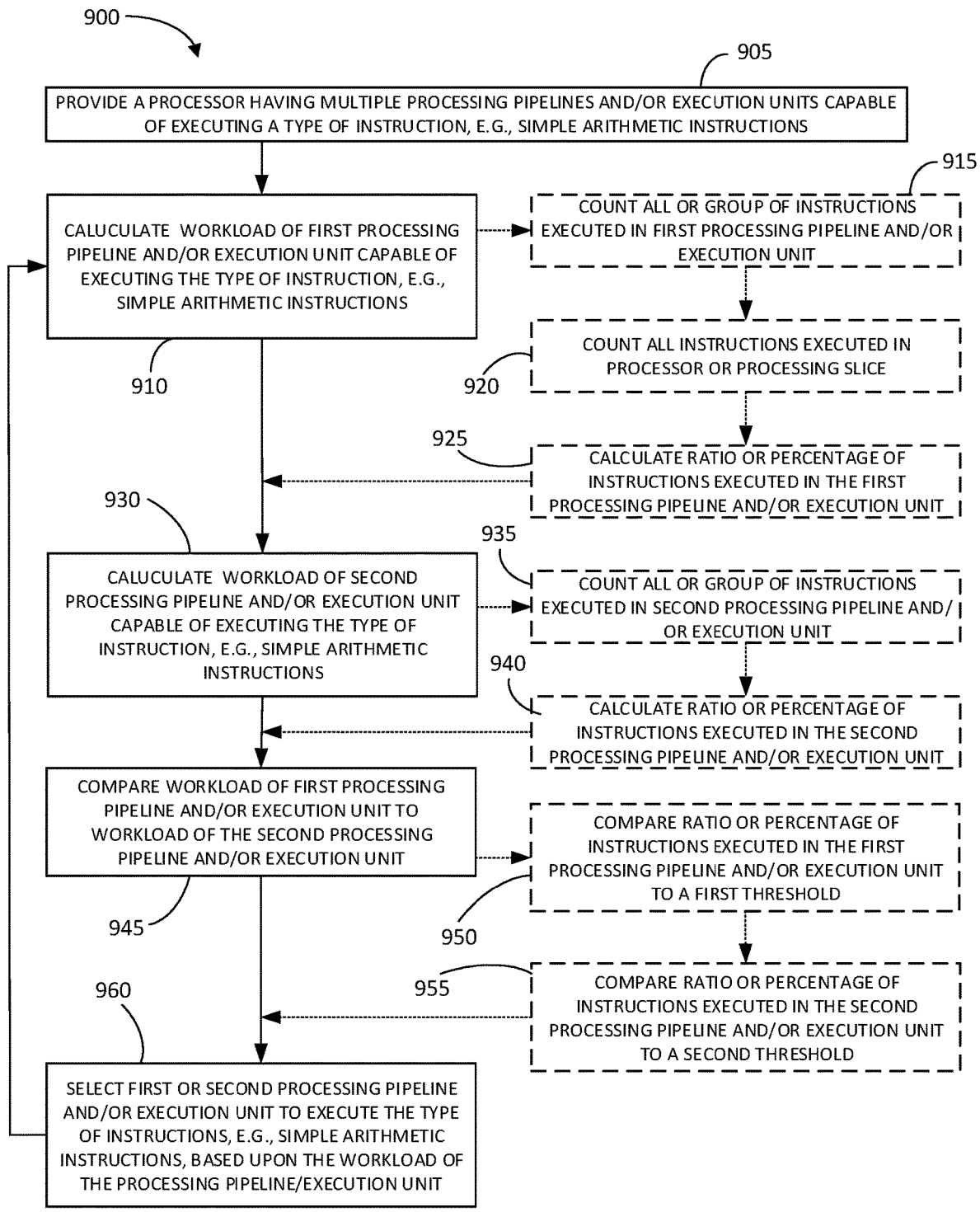
FIG. 9 illustrates a flow chart of a method according to an embodiment for adjusting the workload of one or more execution units in a processor.

Implementation of the selective routing and balancing of execution pipeline and/or execution unit workload can be accomplished using counters to calculate and determine various workloads and using thresholds (adjustable, fixed) to direct different instructions to different execution pipelines and/or execution units FIG. 9 is an exemplary flowchart in accordance with an embodiment illustrating and describing a method of handling data, e.g., executing instructions, in a processor, including in an embodiment, adjusting the workload or execution pipelines and/or execution units in a processor, including in a specific embodiment of selectively routing simple arithmetic instructions capable of being performed in more than one execution pipeline and/or execution unit to a specific execution pipeline and/or execution unit to improve processor performance. While the method 900 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 9, but the process may be integrated and/or one or more steps may be performed together, simultaneously, or the steps may be performed in the order disclosed or in an alternate order.

The method 900 in FIG. 9 relates to adjusting and balancing the workload in a processor to improve processor performance and throughput in processor with multiple execution pipelines and/or execution units. At 905, a processor is provided that has multiple pipelines and/or execution units that are capable of executing a type of instruction, for example simple arithmetic instructions like the addi instruction in Power ISA architecture. Different instructions would be applicable to other processor architectures. Process 900 will be described by reference to both a first processing pipeline and/or first execution unit and a second processing pipeline and/or second execution unit capable of executing a type of instruction, however, it can be appreciated by one of ordinary skill in the art that more than two processing pipelines and/or two execution units in the processor could be capable of executing the type of instruction and the process 900 of adjusting and/or balancing the workload between more than two processing pipelines and/or more than two execution units will be applicable to such processors as well.

At 910 the workload of the first processing pipeline and/or execution unit capable of executing the type of instruction, e.g., a simple arithmetic instruction, is calculated. For ease of discussion the process 900 will be described by reference to simple arithmetic instructions, however, it will be appreciated by one of ordinary skill in the art that the process 900 will be applicable to other types of instructions that are capable of being executed by more than one processing pipeline and/or execution unit. In the example, process 900 is described with reference to a Slice Compute pipe as the first processing pipeline capable of executing the simple arithmetic instruction, and an FX execution unit (e.g., in the first processing pipeline) as the first execution unit capable of executing the simple arithmetic instruction. In the example, process 900 is described with reference to a Store/Branch/Simple pipe as the second processing pipeline capable of executing the simple arithmetic instruction, and an SX execution unit (e.g., in the second processing pipeline) as the second execution unit capable of executing the simple arithmetic instruction.

In one or more implementations, at 915 the workload of the first processing pipeline and/or first execution unit can be calculated by counting all the instructions executed in the first processing pipeline and/or first execution unit. It can be appreciated in one approach, that at 915 the workload of the first processing pipeline and/or first execution unit can be calculated by counting a subgroup of instructions executed by the first processing pipeline and/or first execution unit. For example, at 915, the workload of the first processing pipeline and/or first execution unit can be calculated by counting multi-cycle arithmetic instructions, which are a subgroup of instructions executed by the first processing pipeline and/or first execution unit. In a further approach, at 915 the workload of the first processing pipeline and/or first execution unit can be calculated by counting multiple subgroups of instructions executed by the first processing pipeline and/or first execution unit. For example, at 915, the workload of the first processing pipeline and/or first execution unit can be calculated by counting multi-cycle arithmetic instructions, which are a first subgroup of instructions executed by the first processing pipeline and/or first execution unit, and by counting matrix-multiply-accumulator (MMA) instructions, which are a second subgroup of instructions executed by the first processing pipeline and/or execution unit. It can be appreciated that one or more counters could be provided to count the various instructions and/or instruction groups/subgroups in the processor, processing pipeline, and/or execution unit.

In one or more embodiments, at 920, all instructions executed in the processor or processing slice are calculated, and at 925 a ratio or percentage of instructions executed in the first processing pipeline and/or first execution unit would be calculated. In one approach, at 925 the ratio or percentage of instructions executed in the first processing pipeline and/or first execution unit would be determined by dividing the number of instructions (or subgroup of instructions) executed in the first processing pipeline and/or first execution unit divided by the total number of instructions processed in the respective processor/processing slice. The counting in 915 and 920 according to an embodiment is determined over a fixed or rolling number "N" instructions of the processor/processing slice. For example, the counting of the instructions in the first processing pipeline and/or first execution unit at 915, the counting of all instructions executed in the processor and/or processing slice at 920, and the calculating/determining of the ratio and/or percentage at 925 can be over fixed sixty-four (64) instruction intervals or over rolling sixty-four (64) instruction intervals.

It can be appreciated that according to an embodiment, instead of using ratios and/or percentages of the instructions (or subgroup of instructions) executed in the first processing pipeline and/or execution unit, that a number "N" of instructions (or subgroup of instructions) could be counted at 915 and used at 910 as a basis to determine/calculate the workload of the first processing pipeline and/or first execution unit.

After calculating the workload of the first processing pipeline and/or first execution unit at 910 (e.g., calculating the number/ratio/percentage of instructions (or group of instructions) at 915/925), process 900 continues to 930 where according to one or more approaches, the workload of the second processing pipeline and/or second execution unit capable of executing the type of instruction, e.g., simple arithmetic instructions, is calculated and/or determined. In one or more implementations, at 935 the workload of the second processing pipeline (e.g., Store/Branch/Simple pipe) and/or second execution unit (e.g., SX execution unit) can be calculated by counting all the instructions executed in the second processing pipeline and/or second execution unit. It can be appreciated in one approach, that at 935 the workload of the second processing pipeline and/or second execution unit can be calculated by counting a subgroup of instructions executed by the second processing pipeline and/or second execution unit. For example, at 935, the workload of the second processing pipeline and/or second execution unit can be calculated by counting store, dual-port load, branch and SX instructions, which are a subgroup of instructions executed by the second processing pipeline and/or second execution unit. In a further approach, at 935 the workload of the second processing pipeline and/or second execution unit can be calculated by counting multiple subgroups of instructions executed by the second processing pipeline and/or second execution unit. It can be appreciated that one or more counters could be provided to count the various instructions and/or instruction groups/subgroups in the processor, processing pipeline, and/or execution unit.

In one or more embodiments, at 940 a ratio or percentage of instructions executed in the second processing pipeline and/or second execution unit would be calculated. In one approach, at 940 the ratio or percentage of instructions executed in the second processing pipeline and/or second execution unit would be determined by dividing the number of instructions (or subgroup of instructions) executed in the second processing pipeline and/or second execution unit divided by the total number of instructions processed in the respective processor/processing slice. The total number of instructions processed in the respective processor/processing slice was determined at 920. The counting in 935 and 920 according to an embodiment is determined over a fixed or rolling number "N" instructions of the processor/processing slice. For example, the counting of the instructions in the second processing pipeline and/or second execution unit at 935, the counting of all instructions executed in the processor and/or processing slice at 920, and the calculating/determining of the ratio and/or percentage at 940 can be over fixed sixty-four (64) instruction intervals or over rolling sixty-four (64) instruction intervals.

It can be appreciated that according to an embodiment, instead of using ratios and/or percentages of the instructions (or subgroup of instructions) executed in the second processing pipeline and/or second execution unit, that a number "N" of instructions (or subgroup of instructions) could be counted at 935 and used at 930 as a basis to determine/calculate the workload of the second processing pipeline and/or second execution unit.

After calculating the workload of the second processing pipeline and/or second execution unit at 930 (e.g., calculating the number/ratio/percentage of instructions (or group of instructions) at 935/940), process 900 continues to 945 where according to one or more approaches, the workload of the first processing pipeline and/or first execution unit is compared to the workload of the second processing pipeline and/or second execution unit. In one or more implementations, at 950 the ratio/percentage/number of instructions (or group/subgroup of instructions) executed in the first processing pipeline and/or first execution unit is compared to a first threshold. For example, the ratio and/or percentage of a first subgroup of instructions processed/executed in the first processing pipeline and/or first execution unit, e.g., multi-cycle arithmetic instructions executed in a Compute pipe by a FX unit, is compared to a first threshold, where the first threshold can be, for example, twenty percent (20%), thirty percent (30%), or forty percent (40%) In another example, the number "N" of a first subgroup of instructions processed/executed the first processing pipeline and/or first execution unit, e.g., multi-cycle arithmetic instructions executed in a Compute pipe by a FX unit, is compared to a first threshold, where the first threshold can be, for example, number five (5), twenty-five (25), thirty-two (32), and/or forty-five (45) out of for example a fixed or rolling interval of sixty-four (64) cycles of instructions executed by the processor and/or processing slice. It can be appreciated that the first threshold can be different than the examples listed above, that the first threshold can be fixed, predetermined, programable, and/or adjusted, and will depend in part on the processor and design considerations. In an aspect, comparing the ratio/percentage/number of instructions (or group/subgroup of instructions) executed in the first processing pipeline and/or first execution unit to a first threshold at 950 provides a baseline workload for the first processing pipeline and/or first execution unit, below which the type of instruction, e.g., the simple arithmetic instruction, will be processed in the first processing pipeline and/or first execution unit, and above which the processor might execute the type of instruction, e.g., the simple arithmetic instruction, in the second processing pipeline and/or second execution unit.

In one or more implementations, at 955 the ratio/percentage/number of instructions (or group/subgroup of instructions) executed in the second processing pipeline and/or second execution unit is compared to a second threshold. For example, the ratio and/or percentage of a first subgroup of instructions processed/executed in the second processing pipeline and/or second execution unit, e.g., store, dual-port load, branch, SX instructions executed in a Store/Branch/Simple pipe by a SX unit, is compared to a second threshold, where the second threshold can be, for example, fifteen percent (15%), twenty-five percent (25%), or thirty-five percent (35%). In another example, the number "N" of a first subgroup of instructions processed/executed the first processing pipeline and/or first execution unit, e.g., multi-cycle arithmetic instructions executed in a Store/Branch/Simple pipe by a SX unit, is compared to a second threshold, where the second threshold can be, for example, number fifteen (15), thirty-two (32), forty-five (45), and/or fifty (50) out of for example a fixed or rolling interval of sixty-four (64) instructions executed by the processor and/or processing slice. It can be appreciated that the second threshold can be different than the examples listed above, that the second threshold can be fixed, predetermined, programable, and/or adjusted, and will depend in part on the processor and design considerations. In an aspect, comparing the ratio/percentage/number of instructions (or group/subgroup of instructions) executed in the second processing pipeline and/or second execution unit to a second threshold at 955 provides a baseline workload for the second processing pipeline and/or second execution unit, below which the type of instruction, e.g., the simple arithmetic instruction, will be processed in the second processing pipeline and/or second execution unit, and above which the processor executes the type of instruction, e.g., the simple arithmetic instruction, in the first processing pipeline and/or first execution unit.

After comparing the workload of the first processing pipeline and/or first execution unit to the second processing pipeline and/or second execution unit at 945 (e.g., comparing ratios/percentages/numbers of instructions (or group of instructions) executed in first and second processing pipes and/or first and second execution units to first and second thresholds at 950/955), process 900 continues to 960 where according to one or more approaches, the first or second processing pipeline and/or the first or second execution unit is selected to execute the first type of instruction, e.g., the simple arithmetic instruction, based upon the workload of the first and second pipelines and/or first and second execution units.

In an example, at 960 the first processing pipeline (e.g., Compute pipe) and/or first execution unit (e.g., FX unit) is selected to process the first type instruction, e.g., the simple arithmetic instruction, in response to the workload of the first processing pipeline and/or first execution unit (as determined for example at 925/950) being below a first threshold, e.g., below for example twenty percent (20%). It can be appreciated that the first threshold can be different than the twenty percent (20%) example listed above, that the first threshold can be a fixed, predetermined, programable, and/or adjustable ratio/percentage/number, and will depend in part on the processor and design configurations. In another example, at 960 the second processing pipeline (e.g., Store/Branch/Simple pipe) and/or second execution unit (e.g., SX unit) is selected to process/execute the first type instruction, e.g., the simple arithmetic instruction, in response to the workload of the first processing pipeline and/or first execution unit (as determined for example at 925/950) being above the first threshold, e.g., above for example twenty percent (20%), and the workload of the second processing pipeline and/or second execution unit (as determined for example at 940/955) being below a second threshold, e.g., below fifteen percent (15%). It can be appreciated that the second threshold can be different than the fifteen percent (15%) example listed above, that the second threshold can be a fixed, predetermined, programable, and/or adjustable ratio/percentage/number, and will depend in part on the processor and design configurations. As described above, it can be further appreciated that the first and second thresholds can be expressed as number values instead of ratios or percentages.

Alternatively, and/or additionally, at 960, the first or second processing pipeline and/or the first or second execution unit can be selected to execute the first type of instruction, e.g., the simple arithmetic instruction, based upon the workload of only the first and/or second pipelines, and/or the workload of only the first and/or second execution units. For example, at 960, the first or second processing pipeline and/or first or second execution unit can be selected to execute the type of instruction based on the workload of only the first processing pipeline/execution unit or the workload of only the second processing pipeline/execution unit. At 960, according to an embodiment, the second processing pipeline (e.g., the Store/Branch/Simple pipe) and/or second execution unit (e.g., the SX unit), will execute the type of instruction, e.g., the simple arithmetic instruction, in response to the first processing pipeline (e.g., the Compute pipe) and/or the first execution unit (e.g., the FX unit) processing/executing a second subgroup of instructions, e.g., matrix-multiply accumulator (MMA) instructions, above a third threshold. MMA instructions generally require a lot of compute resources, so in circumstances, where the first processing pipeline and/or first execution unit (e.g., the FX unit) is executing MMA instructions above a third threshold, the processor will process the first type of instruction, e.g., the simple arithmetic instruction, in the second processing pipeline and/or second execution unit.

The third threshold can be, for example, five percent (5%), ten percent (10%), or fifteen percent (15%) In another example, the third threshold can be a number value, for example, number five (5), fifteen (15), or twenty-five (25) out of, for example, a fixed or rolling interval of sixty-four (64) instructions executed by the processor and/or processing slice. It can be appreciated that the third threshold can be different than the examples listed above, that the third threshold can be fixed, predetermined, programable, and/or adjusted, and will depend in part on the processor and design considerations. It can be appreciated that multiple conditions and/or criteria can be placed on determining which processing pipeline and/or execution unit can be selected at 960 to execute the first type of instruction capable of being executed in more than one processing pipeline and/or execution unit. Accordingly, it can be appreciated that one or more of the criteria/conditions discussed above for selecting the different processing pipeline and/or execution units can be used singularly and/or in various combinations.

Accordingly, blocks of the flowchart illustrations support combinations of means for performing the specified functions, combinations of steps for performing the specified functions and program instruction means for performing the specified functions. It will also be understood that each block of the flowchart illustration, and combinations of blocks in the flowchart illustrations, can be implemented by special purpose hardware-based computer systems that perform the specified functions or steps, or by combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A processor for processing information, the processor comprising:
at least two processing pipelines each having one or more execution units for processing instructions, wherein at least a first processing pipeline and a second processing pipeline of the at least two processing pipelines are capable of executing a first instruction type;
an instruction decode unit for decoding instructions to determine which of the first processing pipeline or the second processing pipeline to execute the first instruction type,
wherein the processor is configured to:
calculate the first processing pipeline workload;
calculate the second processing pipeline workload;
compare the first processing workload to a first threshold;
compare the second processing workload to a second threshold;
select the first processing pipeline to execute the first instruction type in response to:
the first processing pipeline workload being equal to or below the first threshold, or
both the first processing pipeline workload being over the first threshold and the second processing pipeline workload being equal to or above the second threshold;
select the second processing pipeline to execute the first instruction type in response to both the first processing pipeline workload being over the first threshold and in response to the second processing pipeline workload being below the second threshold; and
execute the first instruction type in the respective selected first processing pipeline or second processing pipeline.

2. The processor of claim 1, wherein calculating the first processing pipeline workload comprises counting a number of at least a first subgroup of instructions executing in the first processing pipeline.

3. The processor of claim 2, wherein calculating the first processing pipeline workload comprises:
counting all the instructions executed by the at least two processing pipelines; and
determining a percentage of the first subgroup of instructions executed in the first processing pipeline based upon at least one of the group consisting of the number of the first subgroup of instructions, all the instructions executed by the at least two processing pipelines, and combinations thereof.

4. The processor of claim 3, wherein calculating the first processing pipeline workload further comprises counting a number of a third subgroup of instructions executed in the first processing pipeline, determining whether the number of the third subgroup of instructions is over a third threshold, and selecting the second processing pipeline to execute the first instruction type in response to the number of the third subgroup of instructions executed in the first processing pipeline being over the third threshold.

5. The processor of claim 1, wherein calculating the second processing pipeline workload comprises counting a number of at least a second subgroup of instructions executed in the second processing pipeline.

6. The processor of claim 5, wherein calculating the second processing pipeline workload comprises:
counting all the instructions executed by the at least two processing pipelines; and
determining a percentage of the second subgroup of instructions executed in the second processing pipeline based upon at least one of the group consisting of the number of the second subgroup of instructions, all the instructions executed by the at least two processing pipelines, and combinations thereof.

7. The processor of claim 1, wherein the first threshold is at least one of a first threshold group consisting of a number, a percentage, a ratio, and combinations thereof.

8. The processor of claim 7, wherein the second threshold is at least one of a second threshold group consisting of a number, a percentage, a ratio, and combinations.

9. The processor of claim 1, wherein calculating the first processing pipeline workload and calculating the second processing pipeline workload is performed over a fixed or rolling interval of "N" instructions.

10. The processor of claim 1, wherein the first instruction type is a simple arithmetic instruction.

11. A processor for processing information, the processor comprising at least one Super Slice comprising two execution slices, each execution slice comprising at least two processing pipelines capable of executing a first instruction type wherein a first processing pipeline is a Compute pipe having an arithmetic logic unit (ALU) execution unit configured to execute simple arithmetic instructions, a second processing pipeline is a Store/Branch/Simple pipe having a simple (SX) execution unit configured at least to execute simple arithmetic instructions, and the first instruction type is a simple arithmetic instruction;

an instruction decode unit for decoding instructions to determine which of the first processing pipeline or the second processing pipeline to execute the first instruction type, the instruction decode unit comprises a first counter to count the number of a first subgroup of instructions where the first subgroup of instructions comprise at least multi-cycle arithmetic instructions executed in the Compute pipe; and the processor is configured to:

count a number of the first subgroup of instructions using the first counter;

compare the number of the first subgroup of instructions to a first threshold;

select the Compute pipe to execute the simple arithmetic instructions in response to the number of the first subgroup of instructions being below the first threshold;

select the Store/Branch/Simple pipe to execute the simple arithmetic instructions in response to the first subgroup of instructions being equal to or above the first threshold;

execute the simple arithmetic instructions in the respective selected Compute pipe or Store/Branch/Simple pipe.

12. The processor of claim 11, wherein, the instruction decode unit further comprises:

a second counter to count a number of a second subgroup of instructions executed in the Store/Branch/Simple pipe where the second subgroup of instructions comprise at least one of a simple group consisting of store instructions, dual-port load instructions, branch instructions, SX instructions and combinations thereof; and a third counter to count a number of instructions processed in the at least one Super Slice, and the processor is configured to:

calculate a first ratio of the first subgroup of instructions executed in the Compute pipe based upon the number of the first subgroup of instructions executed in the Compute pipe pipeline and the number of instructions counted by the third counter;

count a number of the second subgroup of instructions using the second counter;

calculate a second ratio of the second subgroup of instructions executed in the Store/Branch/Simple pipe based upon the number of the second subgroup of instructions executed in the Store/Branch/Simple pipe and the number of instructions counted by the third counter;

compare the first ratio to a first ratio threshold;

compare the second ratio to a second ratio threshold;

select the Compute pipe to execute the simple arithmetic instruction in response to the first ratio being below the first ratio threshold or the second ratio being equal to or above the second ratio threshold; and select the Store/Branch/Simple pipe to execute the simple arithmetic instruction in response to the first ratio being equal to or above the first ratio threshold and further in response to the second ratio being below the second ratio threshold.

13. The processor of claim 12, wherein, the instruction decode unit further comprises:

a fourth counter to count a number of a third subgroup of instructions executed in the Compute pipe where the third subgroup of instructions comprise at least one of a matrix-multiply accumulator instruction, and the processor is configured to:

count the number of the third subgroup of instructions using the fourth counter;

calculate a third ratio of the third subgroup of instructions executed in the Compute pipe based upon at least one of the group consisting of the number of the third subgroup of instructions executed in the Super Slice Compute pipe, the number of instructions counted by the third counter, and combinations thereof;

compare the third ratio to a third ratio threshold; and select the Store/Branch/Simple pipe to execute the simple arithmetic instruction in response to the third ratio being above the third ratio threshold, regardless of the comparison of the first ratio to the first ratio threshold or the comparison of the second ratio to the second ratio threshold.

14. A method for processing information in a processor, the method comprising:

providing at least two processing pipelines having one or more execution units for processing instructions, wherein at least a first processing pipeline and a second processing pipeline of the at least two processing pipelines are capable of executing a first instruction type;

calculating the first processing pipeline workload comprises counting a number of at least a first subgroup of instructions executed in the first processing pipeline;

calculating a second processing pipeline workload comprises counting a number of at least a second subgroup of instructions executed in the second processing pipeline, the method further comprising:

counting a number of at least a third subgroup of instructions executed in the first processing pipeline that are different than the first subgroup of instructions;

selecting the first processing pipeline to execute the first instruction type in response to:

the third subgroup of instructions being equal to or below a third threshold; and the first processing pipeline workload being equal to or below a first threshold; or both the first processing pipeline workload being over the first threshold and the second processing workload being equal to or over a second threshold; and selecting the second processing pipeline to execute the second instruction type in response to:

the number of at least the third subgroup of instructions being over the third threshold; and the number of the first processing workload being above the first threshold and the second processing pipeline workload being below a second threshold; and execute the first instruction type in the respective selected first processing pipeline or second processing pipeline.

15. The method of claim 14, wherein calculating the first processing pipeline workload comprises counting a number of at least the first subgroup of instructions executed in the first processing pipeline.

16. The method of claim 15, wherein calculating the second processing pipeline workload comprises counting a number of at least the second subgroup of instructions executed in the second processing pipeline.

* * * * *